INVENTOR.
Robert P. Dimmer
BY
C. A. Gulbrandsen
Atty.

3,267,390

SWEEP FREQUENCY GENERATOR AND FREQUENCY CONTROLLING DEVICE THEREFOR

Robert P. Dimmer, Lombard, Ill., assignor to Automatic Electric Laboratories, Inc., Northlake, Ill., a corporation of Delaware Filed Apr. 17, 1961, Ser. No. 103,461
9 Claims. (Cl. 331—117)

This invention relates generally to oscillators and more specifically to electrical sweep frequency oscillators.

Conventional sweep techniques normally require the use of electronic or electromechanical apparatus which is expensive and uses a large amount of power. Electromechanical sweep techniques usually require the use of motors and expensive auxiliary control equipment in complex systems, while electronic sweep techniques normally use reactance tubes which consume large amounts of power and are sensitive to variations in supply voltage.

Other techniques, using the saturable core principle to vary inductance, are also expensive and require auxiliary equipment.

One object of this invention is to provide a simple, inexpensive dependable sweep frequency generator.

In accordance with the principles of this invention, the effective inductance in a tuned circuit of a series tuned oscillator is varied by operation of an electromagnetic device in a periodic manner. Thus the output of the oscillator is a sweep of frequencies determined by the change in inductance.

The sweep frequency generator comprises a two stage oscillator and an output amplifier. The oscillator comprises a Class A amplifier, with a series tuned circuit, driven by a square wave generator. The arrangement is such that the frequency of oscillation is determined by said series tuned circuit in the second stage; the active elements have little effect in determining frequency. There is a feedback path provided from the Class A amplifier so arranged that the input to the square wave generator is a percentage of the oscillator output. The output of the square wave generator is 180 degrees phase removed from the oscillator output and so serves to reinforce the oscillations.

A variable inductance is mechanically coupled to an electromagnetic device by an armature and said device is driven by an external pulse source. This pulse source will drive the electromagnetic device causing a mechanical movement of the armature which will result in varying the inductance and thus the frequency of oscillation. This process is repeated as often as desired, by controlling input pulses. The result is a sweep frequency output from the oscillator.

Other objects will appear from the following description, reference being had to the accompanying drawings in which.

Figure 1:
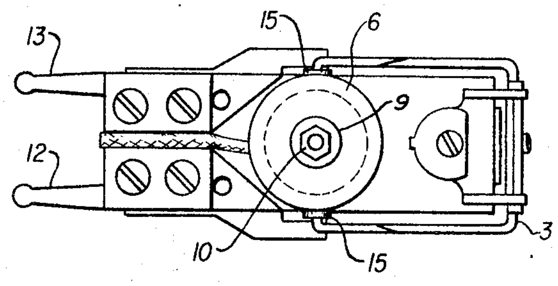
FIG. 1 is a top view of the electromagnetic device with a cup core inductance mounted upon it.
Figure 2:
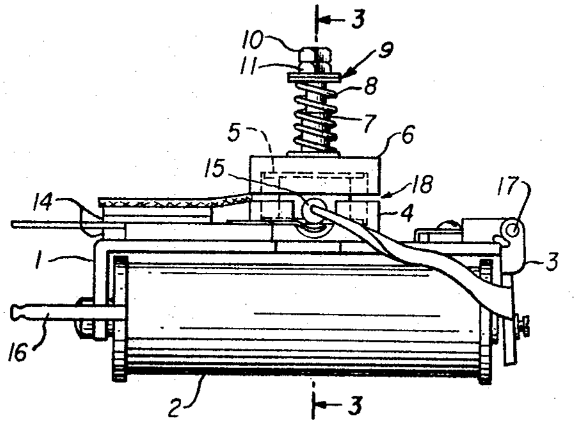
FIG. 2 is a front view of the same device.
Figure 3:
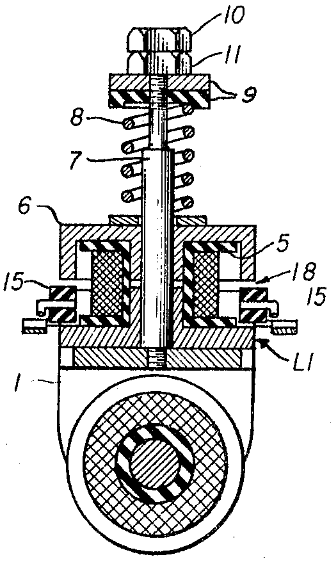
FIG. 3 is a cross-section view of the same device expanded 1.5:1.

A better understanding of this invention may be had by reference to FIGURES 1, 2, and 3 of the device which include a coil 2, an armature 3, a pot core 4 and a brass rod 7 all mounted on a bracket 1, and a bobbin 5 with 1200 turns of wire, a pot core 6, a wire spring 8, washers 9, hex nuts 10 and 11, springs 12 and 13 to which the ends of the wire wound on bobbin 5 are separately connected, insulators 14, buffers 15, lead 16 for energizing coil 2, axis of rotation 17, and air gap 18.

When a pulse of voltage appears at lead 16, coil 2 is energized and a magnetic force is exerted on armature 3 which causes a clockwise torque about axis 17 that tends to separate pot cores 6 and 4 and increase air gap 18 thus reducing the inductance between 12 and 13. If the air gap is increased $\frac{3}{64}$ of an inch the inductance changes from 400 to 20 millihenries. When the pot cores 6 and 4 separate, spring 8 is compressed and remains so until the relay is no longer energized, then pot core 6 quickly returns to its original position. The return time is short compared to the operate time and the device is ready to operate again when a pulse appears at lead 16. This device was found to operate properly at ten pulses per second, in the circuit of FIGURE 4.

Figure 4:
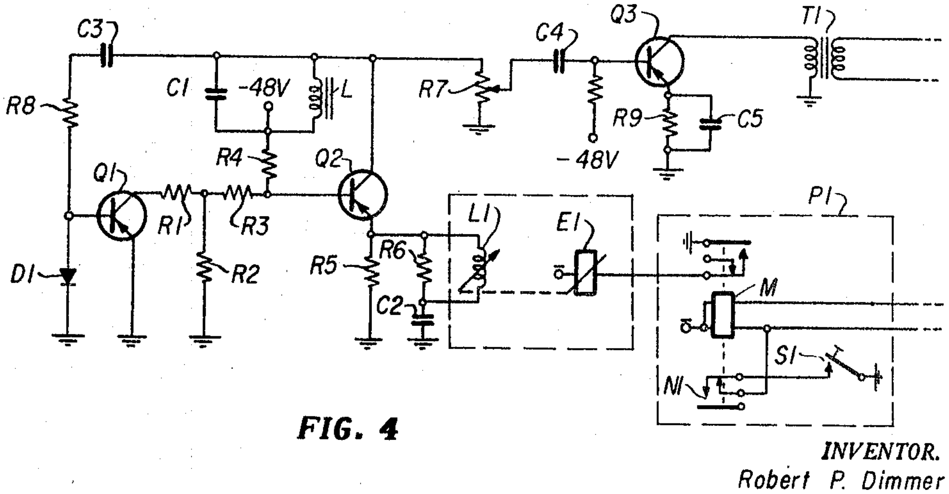
FIG. 4 is an oscillator circuit including the same device.

Operation of the sweep frequency generator is further described with reference to FIGURE 4 including first a square wave generator comprising transistor Q1, diode D1 and resistors R1 and R2, second a Class A amplifier with a filter and a tuned emitter circuit comprising transistor Q2, capacitors C1 and C2, resistors R3, R4, R5, R6 and R7, inductance L and variable inductance L1, third a feedback path from the collector of transistor Q2 to the base of transistor Q1 comprising C3 and R8, fourth an electromagnetic device, E1 such that the combination of L1 and E1 comprising the electromagnetic device and cup core inductance shown in FIGURES 1, 2 and 3 as described above, fifth a pulse source P1 comprising a relay M, switch S1 and contacts N1 and sixth a buffer amplifier comprising transistor Q3, capacitors C4 and C5, resistors R8 and R9 and output transformer T1.

When −48 volts is initially applied to the oscillator circuit the tuned circuit comprising L1 and C2 in the emitter circuit of transistor Q2 begins to oscillate at its natural frequency and this oscillation is reflected in the collector output across resistor R7. Part of this output is used to drive the square wave generator through a feedback path comprising C3 and R8. The square wave generator is so arranged that this feedback will continuously drive the transistor to cut off or into heavy conduction. The square wave output is at the oscillator frequency and approximately 180° phase removed from the oscillator output and so tends to reinforce oscillations by adding energy to the tuned circuit during each cycle.

When the inductance L1 changes its value the natural frequency of oscillation changes and this change is reflected in the oscillator output and in the input to the square wave generator.

The square wave output is then at the new resonant frequency and so acts to reinforce oscillations.

As the change in inductance L1 continues the oscillator output continuously varies in frequency. This oscillator output drives the buffer amplifier and the resultant output at the secondary of transformer T1 is a sweep of frequencies determined by the change in inductance L1.

The effective value of inductance L1 is changed by action of electromagnetic device E1 as described above.

The input to electromagnetic device E1 is provided by a standard buzzer type pulse source P1. When switch S1 is closed a potential is applied to lead 16 of the electromagnetic drive of FIG. 2, as described above, ten times per second, thus there is a sweep of frequency at the rate of ten sweeps per second.

While I have described above the principles of my invention in connection with specific apparatus, it is to be clearly understood that this description is made only by way of example and not as a limitation to the scope of my invention.

What is claimed is:

1. A variable inductance apparatus comprising an inductive element, a movable member for changing the reluctance of the magnetic circuit of said element, and an electromagnetic device for actuating said movable member, said device including a core structure, a coil, and armature assembly coupled to said movable member and mounted on said core structure so as to be attracted in a first state of energization of said coil to a first position wherein it abuts said core structure, thereby causing said inductive element to assume one value of inductance, and means for restoring said armature assembly in a second state of energization of said coil to a second position wherein it is free of said core structure, thereby causing said inductive element to assume another value of inductance.

2. A variable inductance apparatus, as claimed in claim 1, wherein said electromagnetic device is a relay of the telephone type.

3. A variable inductance apparatus, as claimed in claim 1, wherein said means for restoring said armature assembly is a spring.

4. A variable inductance apparatus, as claimed in claim 1, and further comprising a source of direct current, a circuit including said source and said coil, and means for periodically interrupting said circuit.

5. A variable inductance apparatus, as claimed in claim 4, wherein said means for periodically interrupting said circuit is a self-interrupting relay.

6. A variable inductance apparatus, as claimed in claim 1, wherein said movable member comprises at least one arm of said armature assembly, and wherein said inductive element is a cup core device having a winding, a stationary portion mounted on said core structure, and a movable section engaged by said movable member.

7. A variable inductance apparatus, as claimed in claim 6, wherein said cup core device has an opening therethrough, and wherein a shaft extends through said opening connecting to said core structure at its one end and a washer secured at its other end, and wherein said restoring means includes a coiled wire spring disposed around said shaft and interposed between said movable portion and said washer, said spring being compressed by said movable portion upon energization of said coil of said electromagnetic device, and expanding upon de-energization of said coil thereby automatically changing the reluctance of said element from said second-mentioned value to said first-mentioned value.

8. In combination, a variable inductance apparatus comprising an inductive element, a movable member for changing the reluctance of the magnetic circuit of said element, and an electromagnetic device for actuating said movable member, said device including a core structure, a coil, an armature assembly coupled to said movable member so as to be attracted upon energization of said coil to a first position wherein it abuts said core structure, and spring means for restoring said armature assembly upon de-energization of said coil to a second position wherein it is free of said core structure; and an oscillator having frequency determining means including a capacitance and also including said inductive element, whereby upon attraction of said armature assembly the output of said oscillator is changed at a relatively slow rate from one frequency to another frequency, and upon restoration of said armature assembly is changed at a relatively fast rate from said other frequency to said one frequency.

9. The combination as claimed in claim 8, wherein said oscillator is a two stage transistor arrangement comprising a square wave generator first stage and an amplifier second stage, said frequency determining device being connected to the emitter electrode of said amplifier stage.

References Cited by the Examiner

UNITED STATES PATENTS

| | | | |
|---|---|---|---|
| 2,300,996 | 11/1942 | Vanderlyn et al. | 331—168 |
| 2,768,359 | 10/1956 | Side | 336—134 |
| 2,840,779 | 6/1958 | Renant | 336—134 |

ARTHUR GAUSS, *Primary Examiner.*

GEORGE N. WESTBY, J. T. BUSCH, *Assistant Examiners.*